(12) United States Patent
Andersen et al.

(10) Patent No.: US 7,570,607 B2
(45) Date of Patent: Aug. 4, 2009

(54) INTEGRATING VIDEO, VOICE AND DATA TRAFFIC IN A SINGLE, CONFERENCING SYSTEM USING EXISTING CONNECTIONS

(75) Inventors: David B. Andersen, Hillsboro, OR (US); David B. Johnson, Portland, OR (US); Vittal Kini, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 10/860,728

(22) Filed: Jun. 2, 2004

(65) Prior Publication Data

US 2004/0221320 A1 Nov. 4, 2004

Related U.S. Application Data

(63) Continuation of application No. 09/619,522, filed on Jul. 19, 2000, now Pat. No. 6,894,987, which is a continuation of application No. 08/576,080, filed on Dec. 21, 1995, now abandoned.

(51) Int. Cl.
*H04L 12/16* (2006.01)
*H04J 1/00* (2006.01)

(52) U.S. Cl. .................. 370/261; 370/485; 370/487; 370/493

(58) Field of Classification Search ................ None
See application file for complete search history.

(56) References Cited

U.S. PATENT DOCUMENTS 4,847,829 A 7/1989 Tompkins et al.
5,283,637 A 2/1994 Goolcharan
5,381,412 A 1/1995 Otani
5,539,452 A 7/1996 Bush et al.
5,587,734 A * 12/1996 Lauder et al. ............... 725/139
5,671,267 A * 9/1997 August et al. ............... 455/420
5,781,734 A * 7/1998 Ohno et al. .................. 725/115
5,790,173 A 8/1998 Strauss et al.
5,825,829 A * 10/1998 Borazjani et al. ........... 375/308

* cited by examiner

*Primary Examiner*—Chi H. Pham
*Assistant Examiner*—Soon D. Hyun
(74) *Attorney, Agent, or Firm*—Blakely, Sokoloff, Taylor & Zafman LLP (57) ABSTRACT

Video, voice and data are integrated using existing telephone connections by using a video network server to receive and transmit video signals to and from clients using telephone wires. Client frequency division multiplexing couplers, each associated with one of the clients, receive video and telephone signals from the client and frequency multiplex them onto the telephone wires for transmission. They also receive video signals from the server and frequency demultiplex them for transmission to the client. A video frequency division multiplexing coupler connected between the video network server and each of the client frequency division multiplexing couplers receive the video and telephone signals from the clients and transmit only the video signals to the video network server. A telephone frequency division multiplexing coupler connected between a telephone network switch and each of the client frequency division multiplexing couplers receive the video and telephone signals from the clients and transmit only the telephone signals to the telephone network switch.

66 Claims, 8 Drawing Sheets

INTEGRATING VIDEO, VOICE AND DATA TRAFFIC IN A SINGLE, CONFERENCING SYSTEM USING EXISTING CONNECTIONS

CROSS-REFERENCE TO RELATED APPLICATIONS

This application is a continuation of prior application Ser. No. 09/619,522 filed Jul. 19, 2000 now U.S. Pat. No. 6,894,987 which is a continuation of prior application Ser. No. 08/576,080, filed Dec. 21, 1995, now abandoned the priority which is hereby claimed.

BACKGROUND OF THE INVENTION

1. Field of the Invention

The present invention relates to the fields of telecommunications and computing, and more particularly, to the integration of voice, video and computer data in a single network conferencing system.

2. Prior Art

As we enter the new era of multi-media video conferencing technology, more emphasis is being placed on the utilization of personal computer work stations, both within the office and at home, as a primary means of communications with others inside and outside the facility. Until recently, however, the differences in the nature of the types of data needed to be communicated (i.e., voice, video and computer data) in addition to the wiring infrastructures of the facilities has inhibited the integration of these "services" within a single network conferencing system.

Conventional conferencing systems are currently focusing on the use of local area networks (LAN's) as the infrastructure for video conferencing and messaging in the belief that LANs, in addition to wide area networks (WAN's) accessed via a LAN-WAN gateway, are the most ubiquitous communication medium available to desktop computers today. The industry, therefore, is focused on trying to achieve solutions for video conferencing and messaging that use the existing LAN wiring and infrastructure in place within the buildings.

Although LAN's are the preferred interface for computer data and message trafficking within a particular facility due to the high bandwidth capability and available server functions provided for LANs, this medium of communication does not readily allow for the integration of voice and video data with computer data. This is because LANs transmit data asynchronously, whereas voice and video data need to be transmitted in an isochronous format that guarantees a certain amount of bandwidth. LANs are also expensive networks to set-up and maintain. On the other hand, if a telephone PBX were used as the primary communications medium for a conferencing system, problems would arise with respect to the quality of the transmitted video image since PBXs have low bandwidths. Furthermore, the use of telephone PBXs is also expensive due to the cost in connecting to and utilizing the proprietary protocols of typical-site PBX. Alternately, current video-conferencing room systems provide for WAN interfaces. They also provide higher bandwidth, isochronous connections. However, they do not allow for sharing of the WAN interfaces amongst many clients and thus are not economical.

Accordingly, the Telephone PBX and the LAN/WAN Gateway force a choice between bandwidth and isochrony: PBXs provide isochronous channels but they are very low bandwidth connections used primarily for voice, while LAN/WAN Gateways, provide high bandwidth, but the channels they provide are not isochronous.

In contrast the present invention is based on the assumption that the telephone wiring or CATV wiring in a building is far more ubiquitous than LAN wiring. The hypothesis is that every business desktop PC has an associated telephone, while every home or small business PC is also associated with a Cable TV (CATV) connection in addition to a telephone. It would therefore be advantageous to provide a single conferencing mechanism for use by desktop computers at home or in the office which provides an integrated conferencing system having low-cost, bi-directional, isochronous, high bandwidth communications channels implemented through use of the ubiquitous wiring within the building infra-structure.

SUMMARY OF THE INVENTION

It is therefore a feature of the present invention to provide a network conferencing system, for the integration of video, voice and computer data traffic, implemented within the already existing, ubiquitous infrastructure wiring of a facility.

It is another feature of the present invention to provide an integrated network conferencing system that establishes low cost, bidirectional, high-bandwidth isochronous channels to a plurality of desktop computers for the transmission of isochronous information streams so that these streams do not contend with other data traffic originating at the desktop computers.

It is yet another feature of the present invention to provide an integrated network system having a server architecture and LAN connection for unifying the means of accomplishing several key functions required by the desktop computer of the future for conferencing and messaging.

It is a further feature of the present invention to provide an integrated network system having a LAN/WAN gateway connection for handling outside video calls and a network coupling for enabling the sharing and scheduling of external network connections.

It is yet another feature of the present invention to provide an integrated network system as described above which further allows uniformity in the desktop computers used since no special LAN/WAN or PBX characteristics need to be accommodated among the different computers.

To accomplish these and other features, the present invention provides an internetwork communications apparatus for integrating video, voice and computer data traffic in a conferencing system and transmitting the data traffic between the conferencing system and both, a wide area telephone network (WAN) as well as a local telephone network. In the preferred embodiment, the conferencing system comprises a plurality of computer systems coupled to a local area network (LAN) each having at least a video input/output device and an audio input/output device for enabling video conferencing in addition to an associated telephone for enabling separate voice communication. The communications apparatus comprises a network server forming a video private branch exchange (VPBX) coupled to the LAN for controlling the transmission of video data. The apparatus also comprises a LAN/WAN gateway coupled to the LAN and controlled by the VPBX for the transmission of video conferencing and computer data from the computers to the WAN.

Additionally, the communications apparatus further comprises first and second relay means coupled between each computer and an on-site private branch exchange (PBX) of the telephone network and controlled by the VPBX. In one embodiment, the relay means each comprise electrical contact switches for selecting between the video conferencing data and the voice data signals input from the computer and its associated telephone respectively. The selected data signals are transmitted from the first relay means on an isochronous channel on the telephone wire to the second relay means where the appropriate output from the second relay means is selected for transmission to one of the VPBX or the PBX of the telephone network.

Yet, the electrical contact switches of the relay means allow only one of the video conferencing data or the voice data to be transmitted at any one time. Therefore, in accordance with a preferred embodiment of the present invention, the first and second relay means respectively comprise a first and second frequency division multiplexed coupler. The first frequency division multiplexer can operate to multiplex the frequencies of video conferencing and voice signals onto a telephone wire for simultaneous transmission from the first to the second relay means. The second frequency division multiplexed coupler demultiplexes the transmitted signal and couples the respective output signals to the appropriate network. The operation of the first and second relay means is controlled by the VPBX, with the control signals being transmitted thereto via the LAN and the associated computers. The frequency division multiplexed coupler comprises a first modulating unit for modulating a frequency of a first outgoing signal to a first modulated signal having a frequency range corresponding to a first carrier signal. The frequency division multiplexed coupler also comprises a second modulating unit for modulating a frequency of a second outgoing signal to a second modulated signal having a frequency range corresponding to a second carrier signal. A frequency multiplexer is coupled to the first modulating unit and the second modulating unit for multiplexing the first modulated signal and the second modulated signal onto a single telephone wire for transmission to a remote site.

In order to couple the video conferencing data output from each computer to the individual channels of the VPBX, the apparatus further comprises a fan-in multiplexor coupled between the plurality of the second relay means and the VPBX. The fan-in multiplexor comprises a plurality of electrical switches each having a plurality of contacts coupled to the video data output signals of the plurality of second relay means for multiplexing the video data output signals into the plurality of VPBX channels.

With the apparatus and conferencing system described above, the present invention enables the video conferencing data traffic to be sent to the VPBX and subsequently to the WAN without interference from or contention with other traffic on the LAN. Additionally, telephone conferences can be held separately from and simultaneously with video conferences at a desktop conferencing station by implementation of the first and second relay means preferably comprising a frequency division multiplexor and demultiplexor for multiplexing both types of data signals on the same telephone line.

In accordance with an alternate embodiment of the present invention, the conferencing system described above is modified for implementation of conferencing stations within both residential and small business facilities each having at least a computer and a video conferencing device. In this respect, the VPBX is implemented within a CATV cable head-end station for connecting together the conferencing data traffic from each of the facilities at this single location. Within each conference station, a control unit is provided for receiving as input computer data signals from an attached computer system and video conferencing data signals from an attached video conferencing device.

The control unit comprises among other things data compression circuitry for compressing the video conferencing data signals, digital to analog (D/A) conversion circuitry for converting the digital video conferencing data and computer data signals into respective analog signals, modulating/demodulating circuitry for frequency modulating and demodulating of the data signals transmitted to and received from the CATV cable head-end station via the CATV wiring, and processor logic with associated memory for controlling and tracking the operation of the data compression circuitry, the D/A conversion circuitry and the modulating/demodulating circuitry.

The VPBX receives as input the modulated signals transmitted from each of the conference stations and has modulating/demodulating circuitry associated with each CATV cable wiring input for frequency modulating and demodulating of the data signals transmitted to and received from each conference station. The VPBX further comprises a fan-in multiplexor coupled to the modulating/demodulating circuitry of the associated CATV cable wiring inputs for receiving as input the demodulated video conferencing and computer data signals from each conference station. The fan-in multiplexor is further coupled to a WAN gateway via a plurality of isochronous channel lines and to a LAN via a plurality of asynchronous lines for multiplexing the video conferencing data signals and the computer data signals received from the modulating/demodulating circuitry into the channel lines of the WAN gateway and the channel lines of the LAN, respectively.

In this manner, the conference stations of the present invention can be implemented within residential and small business facilities, yet be coupled together for the integrated transmission of video conferencing data and computer data between stations. The VPBX in this embodiment then acts as a neighborhood server for the plurality of conferencing stations by coupling together in an efficient manner the video conferencing and computer data traffic between all the stations in one central, logical location.

BRIEF DESCRIPTION OF THE DRAWINGS

The objects, features and advantages of the present invention will become apparent from the following detailed description in which.

DETAILED DESCRIPTION OF THE INVENTION

Figure 1:
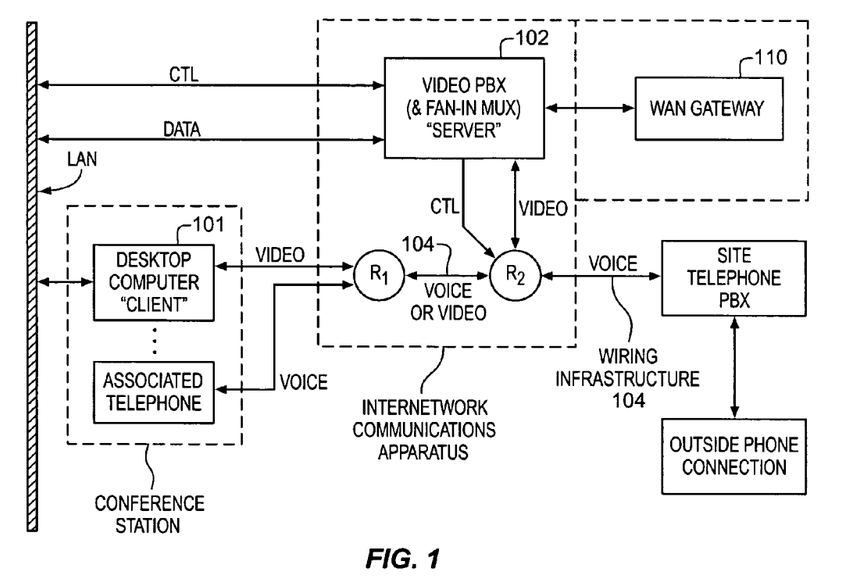
FIG. 1 is a block diagram of the integrated conferencing system of the present invention for use by large businesses showing a generalized embodiment of the internetwork communications apparatus and a single conference station.

A method and apparatus for integrating video, voice and computer data traffic in a single, conferencing system using existing telephone and CATV connections is described. In the following descriptions, numerous details such as specific network components and circuitry, specific wiring characteristics, data transmission characteristics, etc. are given in order to provide a thorough understanding of the present invention. It will be obvious, however, to one skilled in the art that not all the details given are required to practice the present invention. In other instances, well-known components, features, interconnections and the like are not set forth in detail in order to avoid obscuring the description of the present invention According to the present invention, shown generally in FIG. 1, the integrated desktop conferencing system comprises three primary components, namely a desktop computer (also referred to as the "Client") 101, a network server machine 102 (also referred to as the "Server"), and the wiring infrastructure of the facility 104. The present invention will be described in terms of two scenarios, specifically one for use in a large business (the "Big Business Model") and one for use in a small business or home office (the "Small Business Model"). Additionally, several different categories of wiring infrastructure can be used to connect the Client to the Server, including Local Area Network (LAN) wiring, telephone wiring, Cable TV (CATV) wiring, power supply wiring and wireless or remote connections. Although only two of these scenarios, specifically the telephone and CATV wiring infrastructures, are described herein in detail, each of these wiring infrastructures are ubiquitous and can be used in the present invention.

It is also noted that so long as the wiring infrastructure selected is capable of supporting a certain minimum isochronous data rate, it does not matter what protocol is used on the wire. For instance, an analog video signal could be transmitted on the wiring infrastructure, or alternatively, a digital information stream might be used. The most economical protocol that could be employed and still provide the appropriate bandwidth and real-time characteristics would be the appropriate choice. For instance, in the case that digital information streams are transmitted, the well-known and economical Ethernet protocol could be used.

Referring again to FIG. 1, the Client 101 is the instrument employed by the user to engage in conferencing and messaging, comprising a desktop computer in the preferred embodiment. It is connected by some wiring infrastructure 104 to the Server. The Server 102 embodies the services provided to one or more users at one or more Client sites and the resources that are shared amongst these users. The main function of the Server 102 is to connect the local wiring infrastructure 104 to the long haul WANs 110. It is also the natural locus for several types of functions that will be needed to support such conferencing and messaging applications. Furthermore, the Server 102 must also: (1) be able to interface to a wide variety of WAN connections and insulate the Client 102 from these, (2) provide a high bandwidth isochronous connection to the Client 102, and (3) be cost-effective in its over-all implementation and use.

Figure 2:
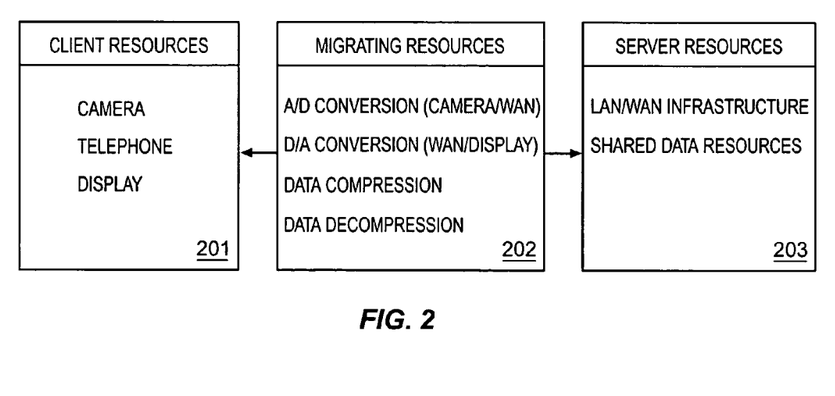
FIG. 2 depicts an exemplary arrangement of the various Server resources, Client resources and other migrating resources.

The conferencing system of the present invention utilizes three classes of resources (i.e., application tools) comprising Client resources 201, Server resources 202 and migrating resources 203 as shown in FIG. 2 and described below.

Client resources: Certain functions reside naturally at the Client end, namely the camera and the display required for conferencing.

Server resources: Likewise, certain functions reside naturally at the Server end, namely, the interface connections to the WAN, sources of Business TV channels, sources of video clips for playback to the Client, etc. The Server isolates the Client from the idiosyncrasies of the shared resources. For instance, depending on geographic location and type of service desired, the WAN connection is highly variable today in its interface characteristics. This variability in interfacing to the WAN is subsumed into the Server and the Clients may then be uniform in their construction.

Migrating resources: Finally, there is a class of functions that may reside either in the Client or in the Server. Where they reside at any time and in any specific implementation is determined by overall implementation cost, degree of sharing required, desired image quality level, etc. Over time, these resources may migrate from Client to Server or vice versa based on changes in cost, quality, need for sharing and so on. In addition, where these functions are implemented (i.e., in the Client or in the Server) also determines the type of protocol that is employed on the wiring infrastructure which connects the Client to the Server. Examples of migrating resources are:

A/D converter: for converting the output signal of an analog camera to a digital stream.

D/A converter: for converting an incoming analog signal into a digital stream required by the display.

Codec: for compressing/decompressing the digital information stream according to some compression algorithm.

I. The Big Business Model

In this first scenario, the wiring infrastructure chosen is preferably the in-building telephone wire. The characteristics of this environment are typically as follows: Telephone wiring is truly ubiquitous since all desktops are assumed to have an associated phone, even though the Client may not be connected to a LAN; telephone wiring is used for isochronous, proprietary protocols to transmit audio streams from the desk telephone to the site PBX; and telephone services, being critical to a business, should not be altered as a result of implementing video-conferencing. It is noted that although the telephone wiring infrastructure is not composed of data grade cable (i.e., Categories 4 and 5), it is still adequate for transmitting around 1.5-2.0 MBits/second which is sufficient to provide near broadcast quality video (e.g., MPEG or CD-ROM).

Figure 3:
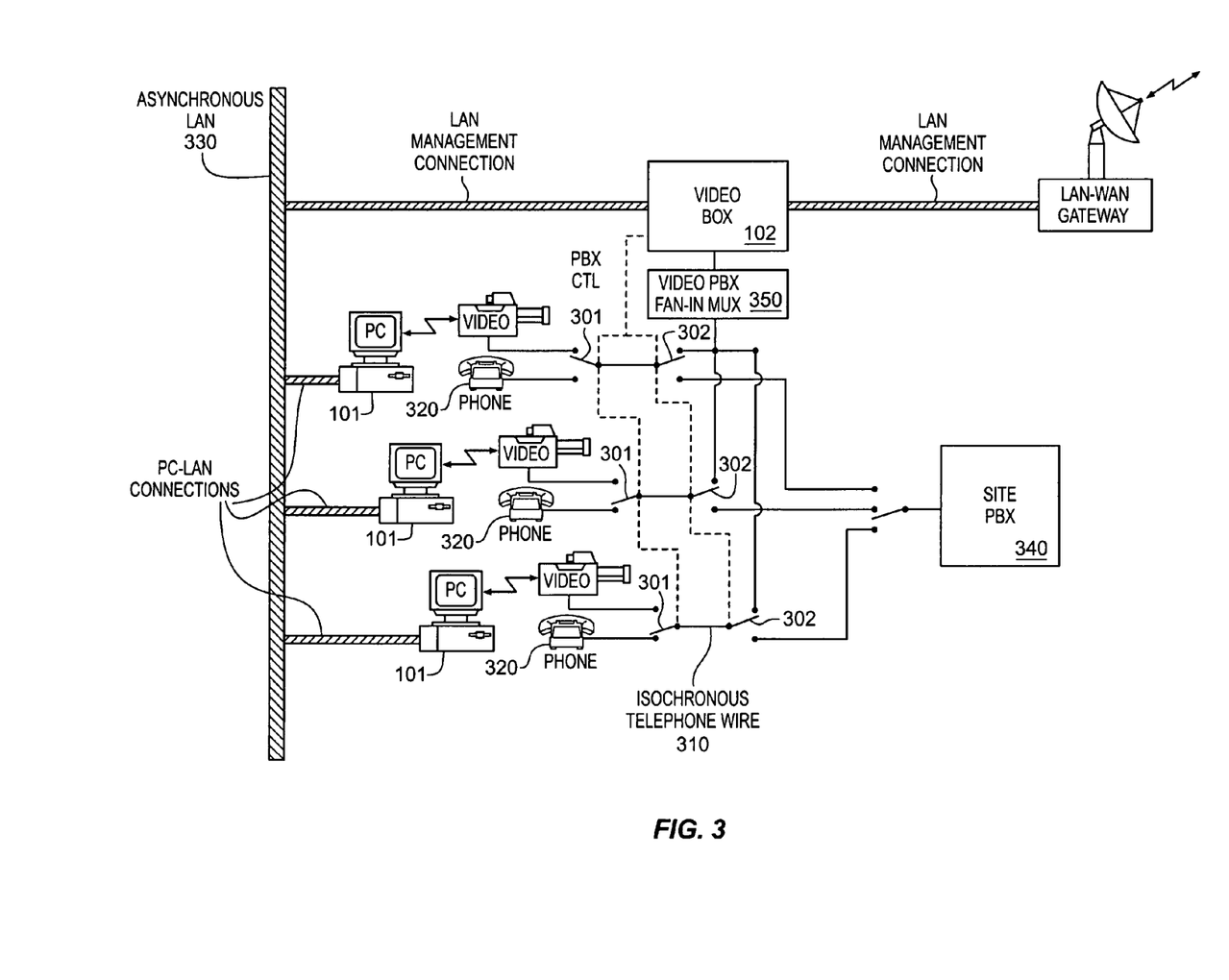
FIG. 3 is a block diagram of a plurality of individual conference stations within the conferencing system of the present invention showing the first and second relay means comprising electrical contact switches.

Since the Telephone is a mission-critical device for a typical business, video-conferencing solutions should not alter any of the functions provided by the user's telephone network. Accordingly, this invention allows the use of telephone wire 310 for video conferencing traffic while preserving telephone functionality for the user. In this regard, FIG. 3 shows an implementation which utilizes standard relays 301 and 302 to achieve this. When normal telephone function is desired, the relays 301 connect the telephones 320 on the desk to the site PBX as is usual. When video conferencing is desired, or an incoming video call is accepted, the Server 102 communicates with the Client 101 over the LAN connection 330 and causes the two relays, one at the Client 301 side and one at the Server 302 side, to be set on the opposite poles. The telephone wire 310 can now be used for video conferencing traffic from the Client 101 to the Server 102, although the telephone 320 cannot be used for the duration of the video call. When the telephone 320 is disconnected for video use of the wire, the site PBX 340 perceives this as being equivalent to the user being absent from his desk, and any incoming voice calls are directed by the site PBX 340 either to a roll-over extension or to the user's voice mail-box.

Figures 4A, 4B:
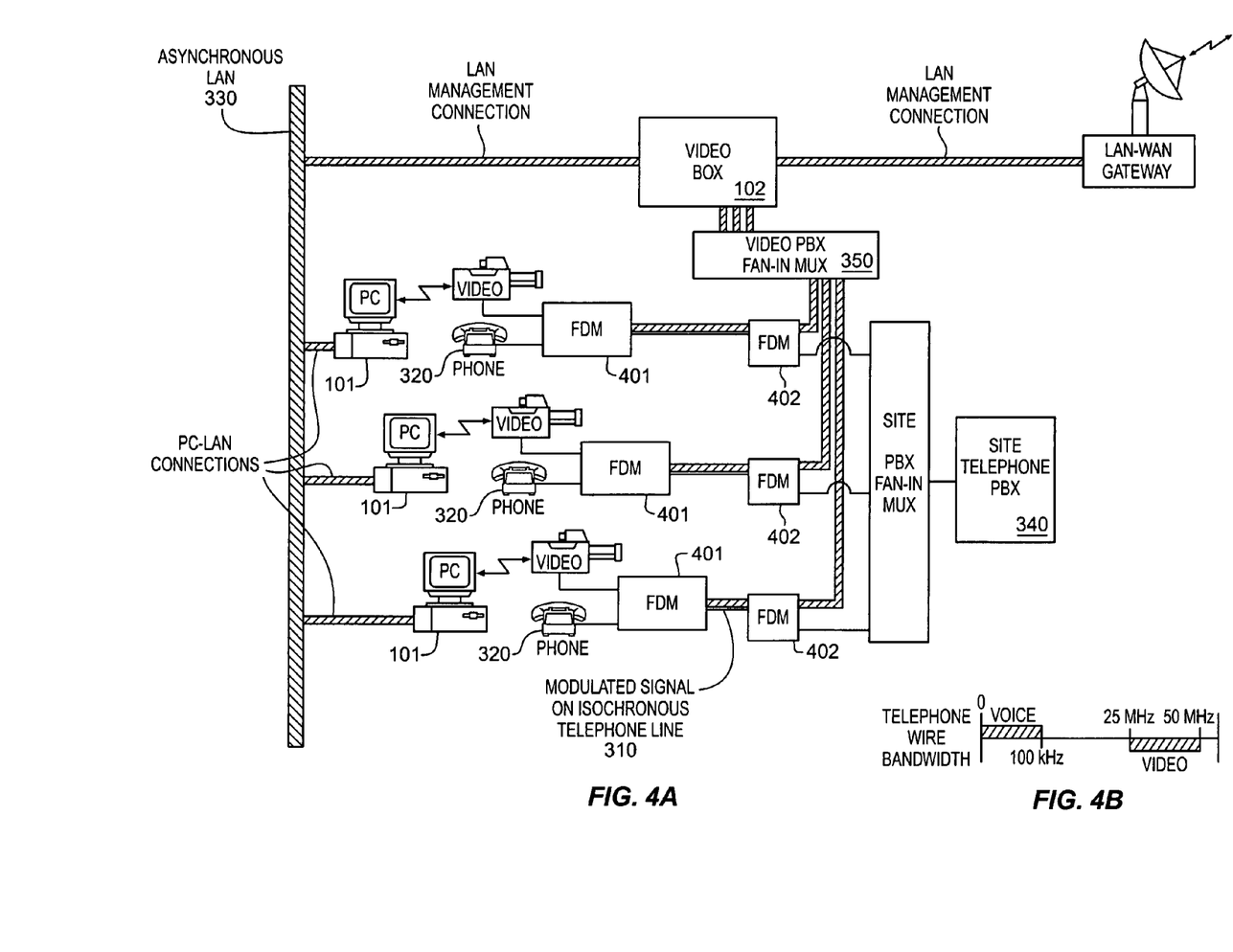
FIG. 4a is a block diagram of a plurality of individual conference stations within the conferencing system of the present invention showing the first and second relay means respectively comprising frequency division multiplexors (FDMs).
FIG. 4b illustrates how the FDM modulates the frequency of two signals.

However, the relay switching solution to using the telephone wiring 310 for video-conferencing has the distinct disadvantage that only one type of connection (voice or video) can be made. This is acceptable if the only use of video is for conferencing. Yet, when the video connection is being used for playback of video clips for training, or for transporting business TV channels to the Client 101, then to lock out normal voice telephone calls would not be desirable. Therefore, as an improvement over the use of relays 301 and 302 in switching from telephone to video communication, a preferred implementation of the present invention utilizes Frequency Division Multiplexed (FDM) couplers or T-couplers 401 and 402 to connect each of the desktop computers of the plurality of Clients 101 to the Server 102. The FDM couplers 401 and 402, shown in FIG. 4(a), achieve a frequency division multiplexing of the normal voice channel and the video channel onto the same wire at the same time. As shown in FIG. 4(b), it does this by shifting the video channel upward to a higher region of the frequency spectrum (Broadband) while the normal voice call occupies its normal frequency band (Baseband).

Figure 5:
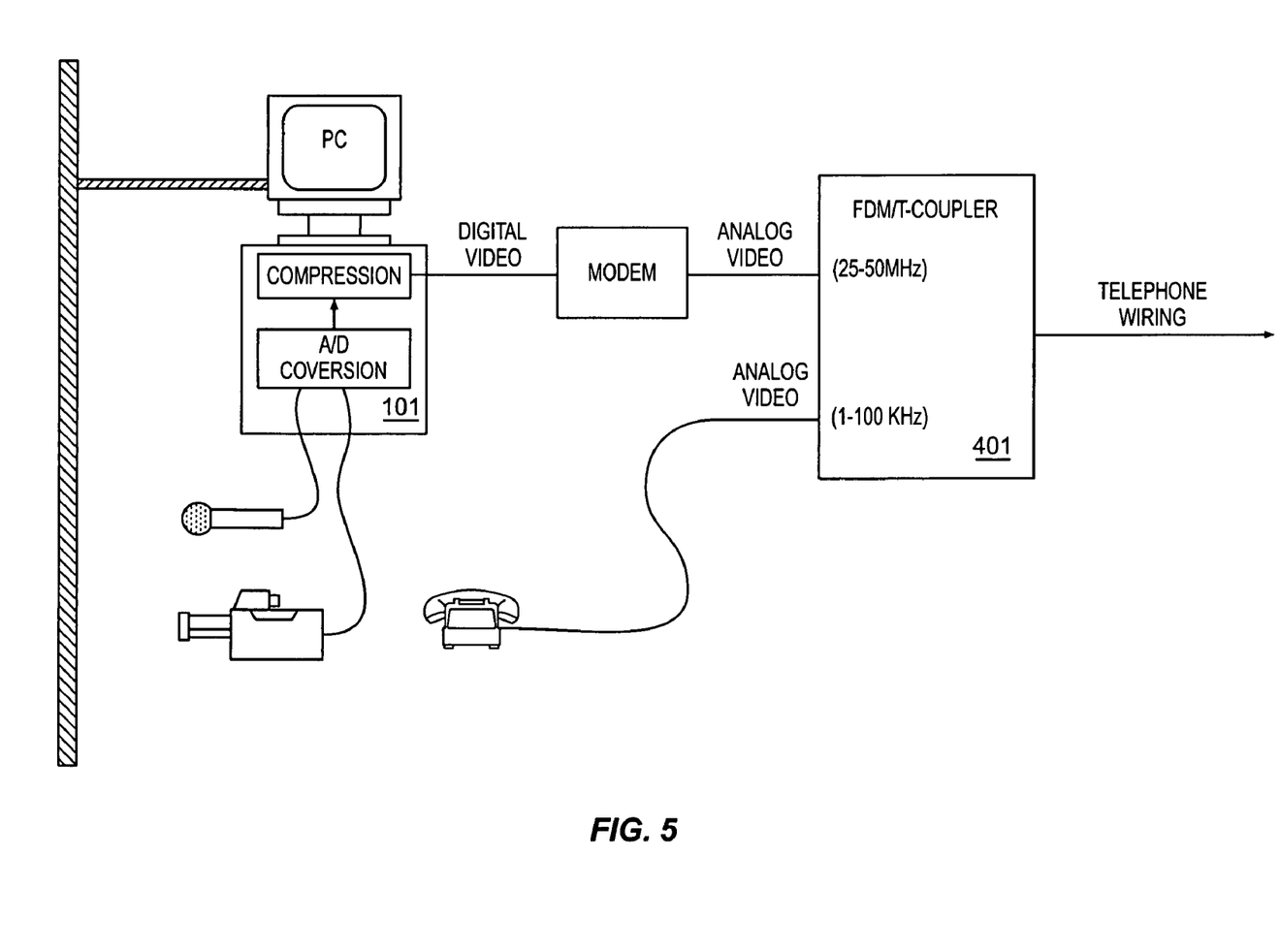
FIG. 5 is block diagram of an individual conference station depicting the compression and signal conversion of the video conferencing data signals transmitted to the associated FDM.
Figure 6:
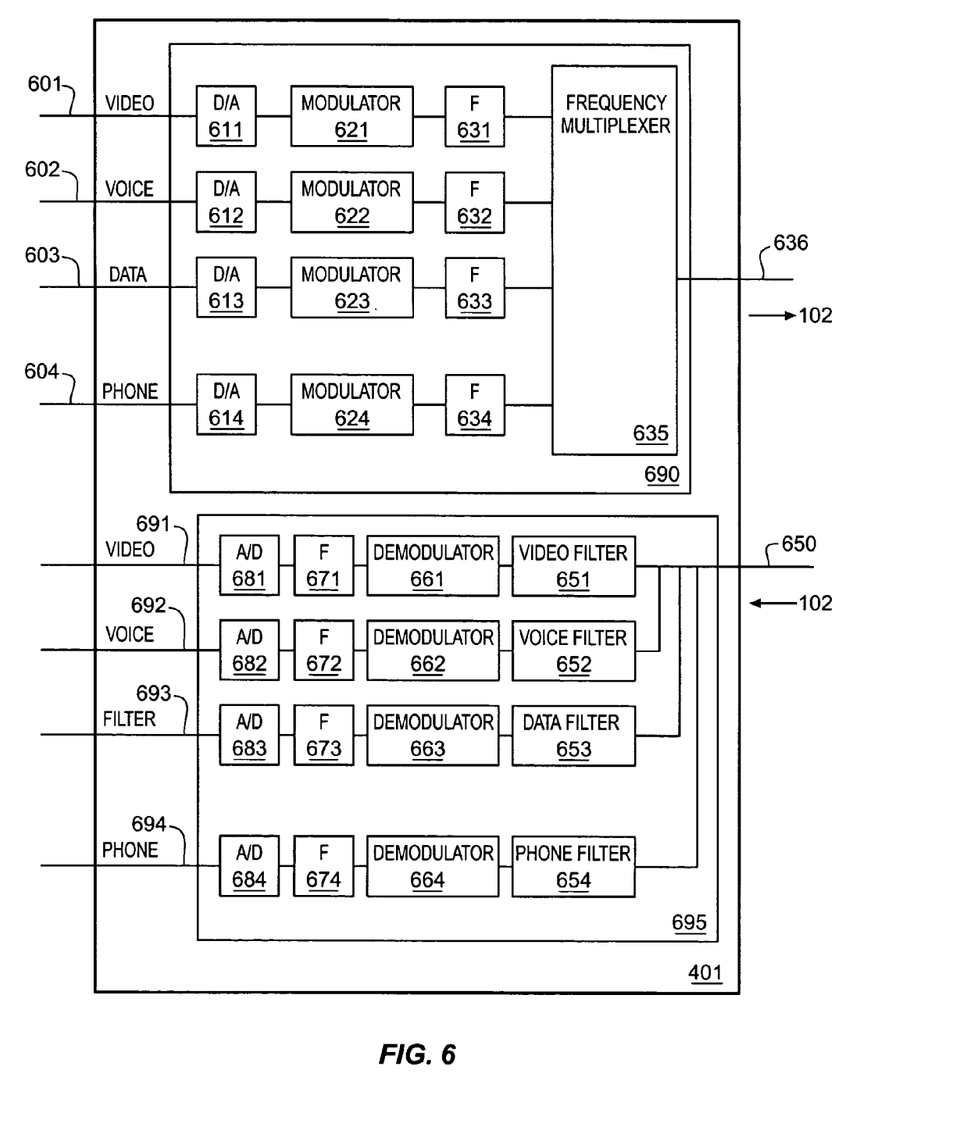
FIG. 6 is a block diagram of one embodiment of the FDM.

Due to the fact that the FDM couplers 401 and 402 of the present invention are preferably designed to multiplex analog as opposed to digital signals, the incoming video from the Client 101 into FDM coupler 401 or from the Server 102 into FDM coupler 402 must be converted to analog form. Depending on the type of phone system implemented, voice data from the phones 320 may or may not need to be converted to analog form. Referring to FIG. 5, since analog to digital conversion and compression of the video data is performed digitally within the desktop computer 101 (assuming these migrating resource are currently located there), the digital video output signal is input to a digital to analog converter, such as a modem, before it is input to the respective FDM coupler. In another embodiment of the present invention, the FDM couplers 401 and 402 comprise circuitry for performing the digital to analog and analog to digital conversion of data internally. FIG. 6 illustrates a block diagram of such an embodiment.

FIG. 6 illustrates a block diagram illustrating one embodiment of FDM coupler 401. FDM coupler 401 comprises an outgoing signal processing unit 690 and an incoming signal processing unit 695. Outgoing signal processing unit 690 operates to process signals received from Client 101 and phone 320 to be transmitted to FDM coupler 402. Incoming signal processing unit 695 operates to process signals received from FDM coupler 402 to be transmitted to Client 101 and phone 320. A first set of lines 601, 602, and 603 are coupled to FDM coupler 401. Lines 601, 602, and 603 carry video signals from Client 101 to FDM 401. A second line 604 is coupled to FDM coupler 401. Line 604 carries phone signals from phone 320 to FDM coupler 401. Lines 601, 602, 603, and 604 are each coupled to a digital to analog (D/A) converter inside FDM coupler 401. D/A converter 611 is coupled to line 601 and operates to convert digital video signals into analog video signals. D/A converter 612 is coupled to line 602 and operates to convert digital voice signals into analog voice signals. D/A converter 613 is coupled to line 603 and operates to convert digital data signals into analog data signals. D/A converter 614 is coupled to line 604 and operates to convert digital phone signals into analog phone signals.

D/A converters 611, 612, 613, and 614 are coupled to modulator units 621, 622, 623, and 624 respectfully. Modulator units 621, 622, 623, and 624 operate to modulate the frequency of each of the analog signals from D/A converters 611, 612, 613, and 614 with respect to a carrier signal frequency. Each of the modulating units 621, 622, 623, and 624 operate with a different carrier signal. As a result, each of the analog signals from D/A converters 611, 612, 613, and 614 will be modulated to a different frequency level with respect to one another.

Modulating units 621, 622, 623, and 624 are coupled to filters 631, 632, 633, and 634 respectively. Filters 631, 632, 633, and 634 operate to filter out noise and harmonics generated by modulating unit 621, 622, 623, and 624 in frequency ranges outside that of the designated carrier signal. This allows the video signals from line 601, the voice signals from line 602, the data signals from line 603, and the phone signals from line 604 to be carried in each of its own band.

Frequency multiplexer 635 is coupled to filters 631, 632, 633, and 634. Frequency multiplexer 635 operates to combine the bands of signals received from filters 631, 632, 633, and 634 and to output the signals on a single telephone line 636. Telephone line 636 is used to transmit video, voice, data, and phone signals originating from lines 601, 602, 603, and 604 to FDM coupler 402 located at the location of the Server 102.

Line 650 is a telephone line used for transmitting analog video, voice, data, and phone signals from the FDM coupler 402 at the location of Server 102 to FDM coupler 401. Signals from telephone line 650 are input to video filter 651, voice filter 652, data filter 653, and phone filter 654. Video filter 651 operates to filter out bands allocated to signals other than video signals. Voice filter 652 operates to filter out bands allocated to signals other than voice signals. Data filter 653 operates to filter out bands allocated to signals other than data signals. Phone filter 654 operates to filter out bands allocated to signals other than phone signals.

Video filter 651, voice filter 652, data filter 653, and phone filter 654 are coupled to demodulating units 661, 662, 663, and 664 respectively. Demodulating units 661, 662, 663, and 664 operate to inject the same carrier signal as those used to modulate the video, voice, data, and phone signals in modulator units 621, 622, 623, and 624.

Demodulator units 661, 662, 663, and 664 are coupled to filters 671, 672, 673, and 674 respectively. Filters 671, 672, 673, and 674 operate to filter out noise and harmonics generated by demodulating unit 661, 662, 663, and 664 in frequency ranges outside that of the original frequency of the signals.

Analog to digital (A/D) converters 681, 682, 683, and 684 are coupled to filters 671, 672, 673, and 674 respectfully. A/D converters 681, 682, 683, and 684 operate to digitize the analog signals received from filters 671, 672, 673, and 674. Line 691 is coupled to A/D converter 681 and operates to transmit digital video signals to Client 101. Line 692 is coupled to A/D converter 682 and operates to transmit digital voice signals to Client 101. Line 693 is coupled to A/D converter 683 and operates to transmit digital data signals to Client 101. Line 694 is coupled to A/D converter 684 and operates to transmit digital phone signals to phone 320.

FDM coupler 402 operates similarly to FDM coupler 401 as shown in FIG. 6. Telephone wire 636 from FDM coupler 401 is coupled to an incoming signal processing unit similar to that of incoming signal processing unit 695 of FDM coupler 401. Lines for video, voice, and data signals from Video PBX 350 and a line for phone signals from Site Telephone PBX 340 are coupled to an outgoing signal processing unit similar to that of outgoing signal processing unit 690 of FDM coupler 401.

Figure 7:
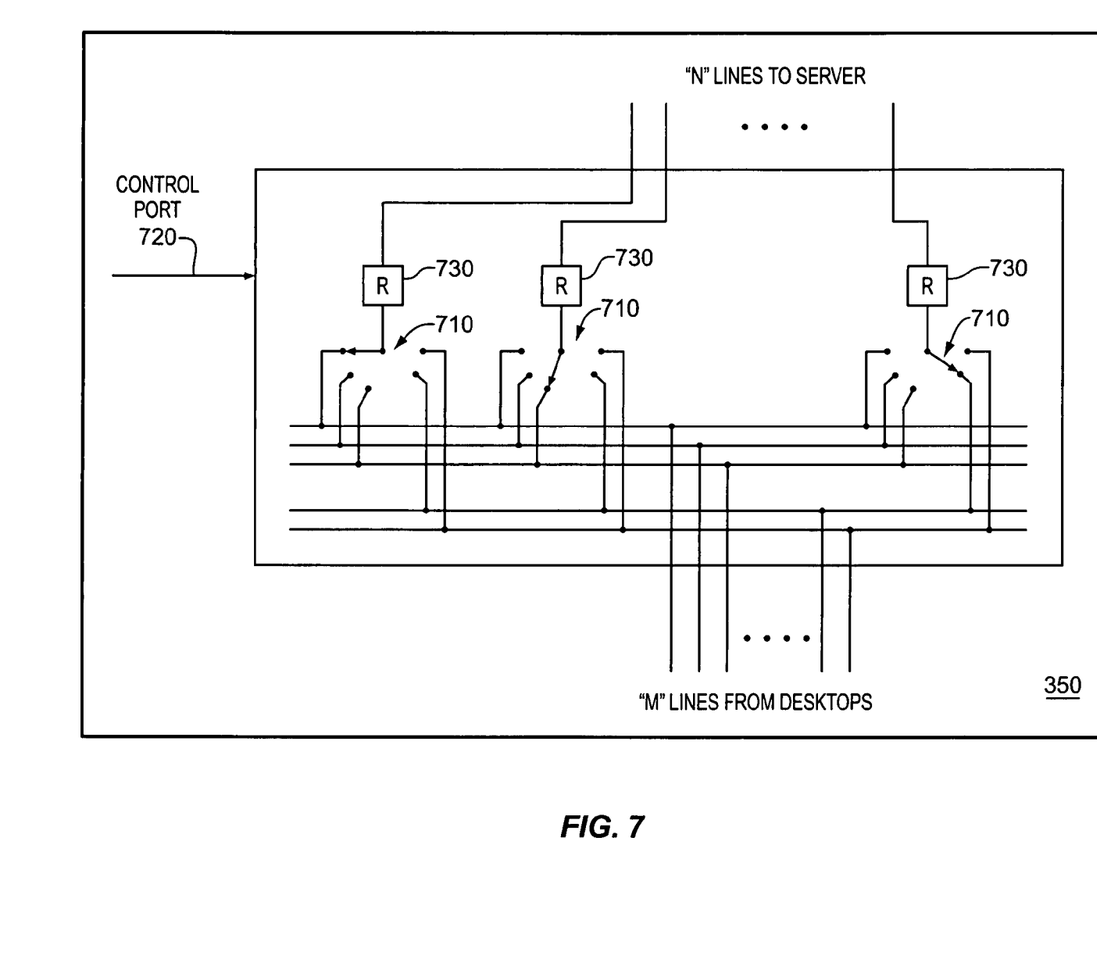
FIG. 7 is a diagram representing the fan-in multiplexor used in the present invention.

Furthermore, in order to enable the WAN connections in the Server to be shared among the Clients 101 in the work group for video traffic, a fan-in multiplexor 350 (shown generally in each of FIGS. 3 & 4(a), but detailed in FIG. 7), comprising a plurality of arranged relays 710, is used to multiplex M active video channels of M Clients into N channels connecting the Server to the LAN/WAN gateway. The relays 710 can be electronic switches in addition to simple contact switches. FIG. 7 is a diagram representation of the fan-in multiplexer. If the size of the Client work group being served by the Server is, for example, M users (M>N), then the M channels coming toward the Server must be multiplexed into no more than N inputs into the Server. Obviously, with this arrangement, there can be at most N Clients with video calls in progress, with the others waiting their turn to originate a video call.

The control port of the fan-in multiplexor 350, depicted in FIG. 7, represents a mechanism of an outside agent (e.g., the Server) that affects the setting of the relays 710 inside the fan-in multiplexor 350. The control port 720 is used to set the appropriate relays 710 in the appropriate configuration at the time of setting up a video conferencing call or terminating one. Additionally, coupled to each relay 710 is a repeater R 730 comprising a regeneration device (e.g., a digital bus transceiver, or an analog video amplifier) which is used to minimize signal attenuation.

II. The Home/Small Business Model

In the second scenario of implementing the present invention in either a home or small business, the CATV wiring in these facilities would be used as the infrastructure. CATV wiring is chosen for this implementation for the following reasons: It is ubiquitous since nearly 99% of U.S. homes have a CATV cable running nearby if not actually connected to the home; the CATV cable is a high bandwidth medium which is expected to provide even higher bandwidth in the near future when digital transmission and compression provide the capability of shipping 500 or more channels downstream to the CATV markets; the CATV infrastructure is designed for two way communication although the installed base does not yet take advantage of the upstream channels; and there are possible frequency spectrum allocation strategies on the CATV cable that can improve the capacity and number of upstream channels.

The same Client-Server model described above is implemented in the home or small business application using CATV wiring. The CATV infrastructure is used to transmit conferencing information streams from the home or small business to the CATV cable head-end (at a CATV station center) where a Server (as described above) installed at the cable head-end is able to direct these conferencing streams comprising computer data and video conferencing data to the appropriate LAN and WAN. LAN and WAN connections in addition to the Codecs reside in the Server at the cable head-end and are shared by all of the subscribers to the facility. Connect time to Codecs and the LAN and WAN connections would be rented out to subscribers. The cost of the Codecs and other shared Server components is eventually amortized over a large user base and therefore higher quality Codecs can be used.

The Client in this scenario comprises a very low cost control box offered for rental by the CATV provider to the end user. It would connect to the user's TV as does today's cable TV control box. It would also provide the capability of connecting a camera, a microphone and a home computer to it. This set up would allow video, as well as both audio and data conferencing. If the Client environment is in a hotel, the hotel could offer the Client side hardware as a rental option to hotel guests and implement a CATV-based VPBX within its facilities for sharing by its guests.

Additionally, several physical channels on the CATV cable could be "stacked" together to provide enough bandwidth to present to the user a semblance of a logical LAN (e.g., Ethernet) connection. In this manner, logical star-configured LANs could be provided from the CATV providers cable head end that allow a home-based computer to be networked to other computers at other locations. This kind of a service would be invaluable in supporting telecommuting applications since home-based computers could be networked to those at business office sites via the ubiquitous CATV wiring infrastructure. Such virtual LANs on the CATV infrastructure would also facilitate integrated messaging applications for the vast home market.

Figure 8:
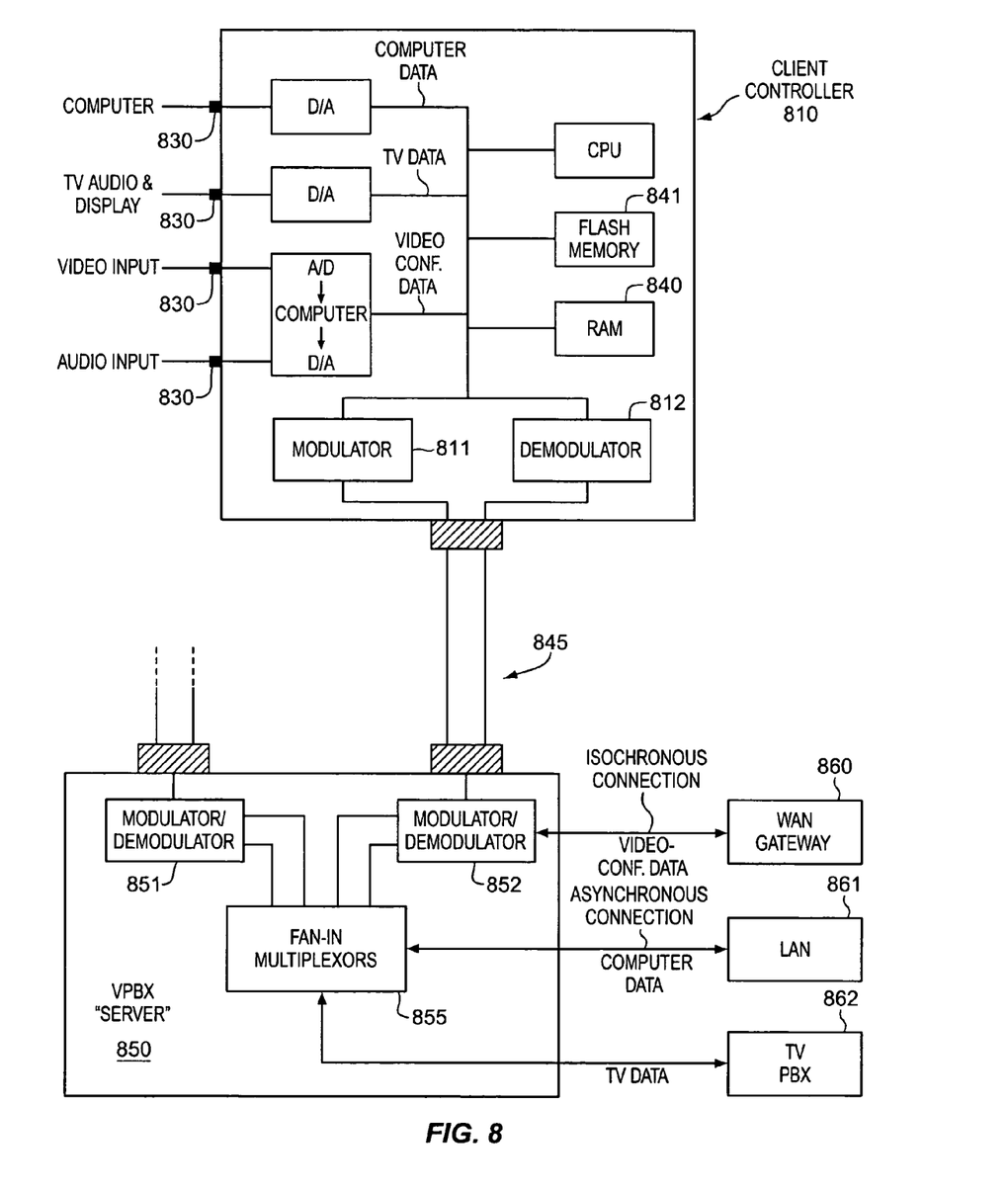
FIG. 8 is a block diagram of an alternate embodiment of the integrated conferencing system of the present invention for use by residential homes and small businesses, showing the client controller implemented within an individual conference station (at home) and the VPBX implemented within a CATV station head.

The Client side hardware, referred to herein as the "Client controller" 810 is depicted in FIG. 8. It consists of the modulators 811 and demodulators 812 that allow the transmission of information streams over selected physical frequency bands on the CATV cable, thus providing logical information channels. The Client controller 810 also provides connection ports 830 where a camera, a microphone and even a computer can be attached. A connection to the home TV set would further allow the TV to function as a video-conferencing display. The Client controller 810 further comprises an internal processor with RAM 840 and Flash Memory 841 to provide intelligence to the Client controller that can be programmed remotely from the cable head-end.

Also shown in FIG. 8 is the CATV cable 845 coupling of the Client controller 810 of one residence to the VPBX 850 at the CATV head. As shown, the VPBX 850 comprises modulator circuitry 851 and demodulator circuitry 852 for each CATV input 845 in order to demodulate a modulated CATV signal into respective computer data, video conferencing data and TV data signals subsequently input to a fan-in multiplexor 855 for coupling the appropriate data signals to the WAN gateway 860, the LAN hub 861 and the TV PBX 862 residing at the CATV head-end.

In accordance with a preferred embodiment of this model, the fan-in multiplexer would be implemented within the tuner/demodulator circuitry 851 of the VPBX Server 850 so that the Server 850 acts as the "neighborhood Server" for a neighborhood served by the CATV provider. When a physical channel on the cable is selected to serve a video-conference originating from a particular home, the neighborhood server would then connect that physical channel to one of the channels between the neighborhood server and the cable head end, or the WAN 860, that is reserved for video-conferencing. If there are N such reserved channels between the neighborhood server and the WAN or cable head end, then no more than N video conferences can be in progress simultaneously in that neighborhood.

Furthermore, the Client controller unit 810 and the neighborhood Server 850 together could be used to "stack" several of the physical channels available on the CATV cable to serve as a virtual LAN connection. In this case, each subscribing home unit would then be at the leaf position of a star configuration LAN centered on a logical LAN Hub at the cable head end of that particular CATV cable. The logical LAN hub would be connected to other hubs via a WAN or other means to generate geographically distributed LANs. The predominant use of this scheme is anticipated in providing metropolitan area LANs that could support telecommuting applications.

Figure 9:
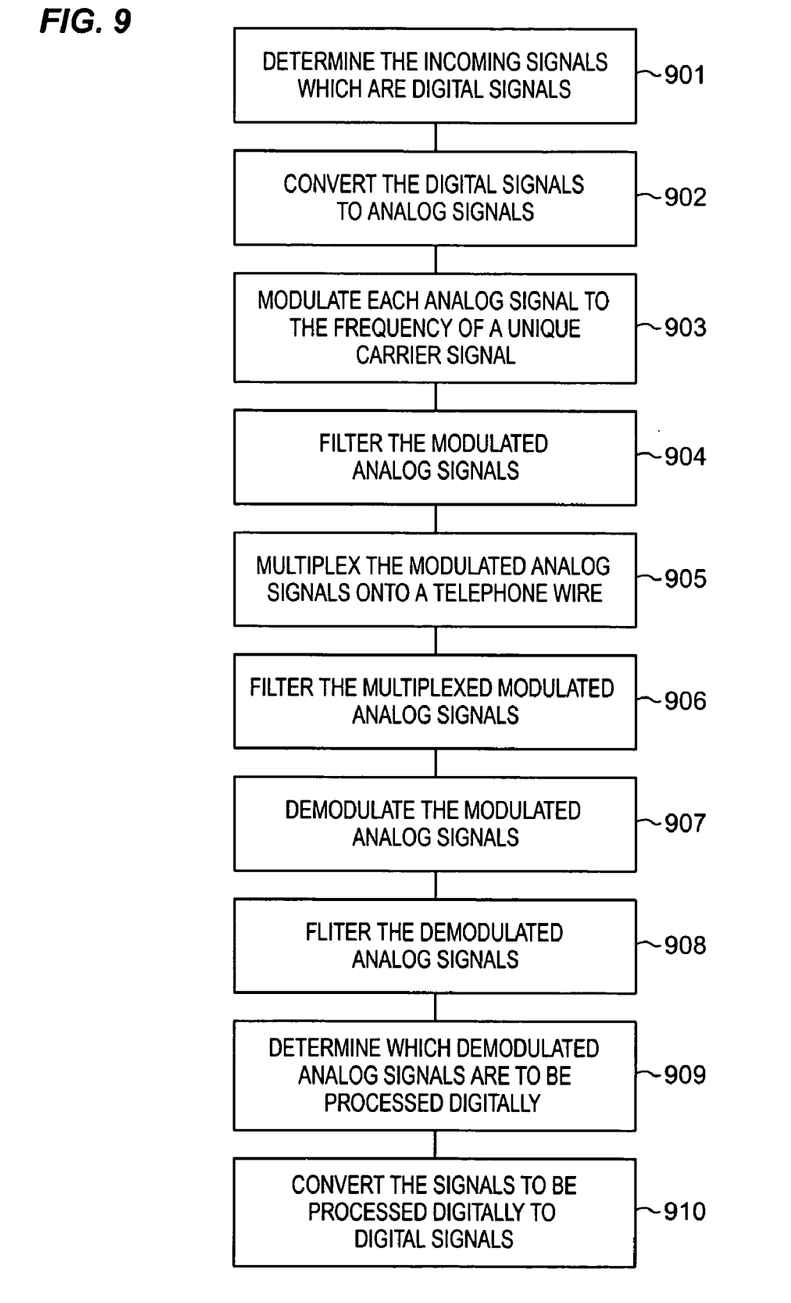
FIG. 9 is a flow chart illustrating a method of transmitting a plurality of signals on a single telephone wire.

FIG. 9 is a flow chart illustrating a method for using a telephone wire for transmitting a plurality of signals such as video and phone signals. For processing outgoing signals at a first site, first determine which signals are digital signals and which signals are analog signals. This is illustrated in block 901. Convert signals which are digital signals to analog signals. This is shown in block 902. Using a carrier signal with a unique frequency for each of the analog signals, modulate each of the analog signals to the frequency of its corresponding carrier signal such that each of the modulated analog signals are at a different frequency range. This is shown in block 903. Filter away harmonics in each of the modulated analog signals which do not belong in the frequency range of the analog signal's corresponding carrier signal. This is shown in block 904. Multiplex the modulated analog signals onto a telephone wire for transmission to a remote site. This is shown in block 905.

For processing incoming modulated analog signals multiplexed on a telephone wire, filter the incoming modulated analog signals to isolate the band of each of the modulated analog signals. This is shown in block 906. Demodulate each of the modulated analog signals using the frequency of the modulated analog signal's corresponding carrier signal. This is shown in block 907. Filter away the harmonics in each of the demodulated analog signals which do not belong in the frequency range of the analog signal's corresponding carrier signal. This is shown in block 908. Determine which of the demodulated analog signals are to be processed digitally. This is shown in block 909. Convert these analog signals to digital signals. This is shown in block 910.

In summary, unlike conventional networks for integrating video, voice and computer data traffic, the present invention is able to avoid contention with other data traffic flowing to or from the desktop computer, provides a low-cost, high bandwidth, bi-directional channel for isochronous information streams that uses existing ubiquitous wiring infrastructure without significant perturbations to the infrastructure, and lowers the cost of video-conferencing and messaging by providing for the sharing of expensive or higher-quality functional units.

The use of relays 301 and 302 in a first implementation of the large business model allow the telephone wiring to be appropriated for the purpose of transmitting high bandwidth isochronous data traffic (e.g., video-conferencing). The high reliability and passive nature of the relay components 301 and 302 ensures that the overall reliability of the telephone network is not compromised. Furthermore, the way in which these relays 301 and 302 are incorporated into the telephone wiring can be designed to ensure that during power failures, or if the user's computer is turned off, the relays 301 and 302 default to a contact position internally that preserves the connection of the desktop telephone to the site PBX.

With the use of FDM couplers 401 & 402, the second implementation of the large business model allows the transmission of high bandwidth, isochronous data traffic on telephone wires but without any contention with the telephone traffic that could be using the wire at the same time. This has the distinct advantage that normal telephone functions at the user's desk are not changed or diminished. Again, as in the case of the relay-based solution, FDM couplers 401 and 402 are passive device and will not affect the reliability of ordinary telephone service at the user's desk.

With respect to the Server 102, the Server 102 is a fundamental component of both wiring infrastructure scenarios. It provides high-bandwidth isochronous information channels to Clients on the one hand, while connecting to the WAN with all its variability on the other hand. It also forms the logical locus at which video-playback, video-record and business TV transmission functions might be connected for everyone to use. It is designed to do all of this at an economical price point by allowing resources to be shared and thereby reducing per-Client cost. Most importantly, it is the first time that such capabilities are integrated into a single functional unit.

The Server 102 can also be a locus for facilitating integrated messaging by interfacing to the site PBX 340 via a regular telephone line. This allows the Server to scan the voice-mail boxes of the work group that it serves and present these as sound objects in the user's integrated electronic mailbox.

Additionally, the fan-in multiplexer 350 is an inexpensive switch box that does not have to be as sophisticated as a cross point switch. All it needs to accomplish is the "funneling" of video information streams originating at the Client 101 side into the limited number of off site WAN connections that are provided by the Server 102. This kind of multiplexing is simple to achieve irrespective of whether the signals being switched are analog or digital, but the fan-in multiplexer 350 plays an important role in allowing the number of Client side connections to the Server 102 to be reduced to equal the number of connections provided on the WAN side of the PBX 102. Furthermore, it also allows the Server 102 to reside in a place physically removed from that at which all of the Client connections converge (e.g., a wiring closet) since only a physically small box embodying the fan-in multiplexer need be placed at this location.

With respect to the home or small business scenario, the Client controller 810 in the CATV video-conferencing application comprises an intelligent modulator/demodulator box that for the first time brings together video conferencing functions and CATV functions in one unit and enables video-conferencing over the ubiquitous CATV wiring infrastructure. By connecting a computer to the Client controller 810, data-conferencing can also be achieved.

Finally, with respect to implementing virtual neighborhood LANs in the second scenario, the advantage of using virtual LANs based on the CATV infrastructure is their significant cost advantage over similar solutions provided by the Regional Bell Operating Companies (RBOCs). The RBOC solutions will likely require special connections to be brought into the subscribers premises for some time to come, and thus, be much more expensive. Meanwhile, the CATV infrastructure provides more bandwidth and is already established at virtually every subscriber's premises. Thus, telecommuting applications are conceivably more likely to flourish on CATV virtual LANs rather than on RBOC virtual LANs.

While the invention has been described in conjunction with the preferred embodiments, it is evident that numerous alternatives, depictions, variations and uses will be apparent to those skilled in the art in light of the foregoing description. Thus, it is understood that the invention is not to be limited by the foregoing illustrative details, but rather is to be defined by the appended claims.

What is claimed is:

1. A client controller comprising:
   a computer network connection port;
   a television connection port;
   a video input port;
   an audio input port;
   a modulator to modulate information streams from each port over selected physical channels on a single line wiring infrastructure, the computer network connection port having several physical channels stacked together;
a demodulator to demodulate information streams from the selected physical channels on the single wiring infrastructure and apply the information streams to each respective connection port; and
an internal processor to provide intelligence to the client controller including to control the modulator and the demodulator.

2. The controller of claim 1, wherein the single line wiring infrastructure comprises at least one of telephone wire, a local area network wire, and a power supply wire.

3. The controller of claim 1, wherein the single line wiring infrastructure comprises CATV (Cable Television) cable and wherein the CATV cable is coupled to a video server at a CATV head-end.

4. The controller of claim 3, wherein the internal processor can be programmed remotely from the CATV head-end.

5. The controller of claim 1, wherein the client device comprises a video conferencing station.

6. The controller of claim 1, further comprising additional connection ports to attach at least one of a camera, a video source, a microphone, a computer, a display device, and a television.

7. The controller of claim 1, wherein the physical channels are combined to form a logical information channel.

8. The controller of claim 1, wherein the information streams comprise at least one of computer data, television data, and video conferencing data.

9. The controller of claim 1, further comprising data compression circuitry to compress the information streams before being modulated.

10. The controller of claim 1, further comprising a digital to analog converter to convert the information stream to an analog signal before being modulated.

11. The controller of claim 1, wherein the selected physical channel for telephone information is a baseband frequency band and the selected physical channel for a video channel is a broadband frequency band.

12. The controller of claim 1, wherein the modulator shifts video information streams to a higher frequency broadband channel.

13. A method comprising:
modulating information streams from a computer data network connection port, a video conference isochronous data connection port, and a television data connection port over selected physical channels on a single line wiring infrastructure, the computer network connection port having several physical channels stacked together;
demodulating information streams from the selected physical channels on the single line wiring infrastructure; and
communicating the information streams through a each respective connection port to a client device.

14. The method of claim 13, wherein the single line wiring infrastructure comprises CATV (Cable Television) cable and wherein the CATV cable is coupled to a video server at a CATV head-end.

15. The method of claim 13, wherein the information streams comprise at least one of computer data, television data, and video conferencing data.

16. The method of claim 13, further comprising compressing the information streams before modulating.

17. The method of claim 13, further comprising converting an information stream to an analog signal before modulating.

18. The method of claim 13, wherein modulating comprising shifting video information streams to a higher frequency broadband frequency band.

19. A head-end controller comprising:
a plurality of inputs coupled to a single line wiring infrastructure, the inputs including a computer data network connection port, a video conference isochronous data connection port, and a television data connection port;
modulator circuitry for each input to modulate respective data and video signals into the single line wiring infrastructure, the computer network connection port having several physical channels stacked together;
demodulator circuitry for each input to demodulate respective data and video signals from the single line wiring infrastructure; and
a fan-in multiplexor to couple the demodulated data signals to a data network hub, and to couple the demodulated video signals to a video gateway.

20. The controller of claim 19, wherein the data and video signals comprise computer data, video conferencing data and TV data signals and wherein the fan-in multiplexor couples the computer data to a network hub, couples the video conferencing data to a WAN (Wide Area Network) gateway, and couples the TV data signals to a TV switch.

21. The controller of claim 19, wherein the single line wiring infrastructure comprises a CATV (Cable Television) infrastructure and wherein the TV switch is at a CATV head-end.

22. The controller of claim 19, wherein the single line wiring infrastructure comprises a CATV infrastructure and wherein the fan-in multiplexer resides within a video server at the CATV head-end so that the video server serves a network neighborhood served by a CATV provider residing at the CATV head-end.

23. The controller of claim 19, wherein when a physical channel on the single line wiring infrastructure is selected to serve a video conference originating from a particular subscriber, a video server connects that physical channel to a channel between the video server and the wiring infrastructure head end for video-conferencing.

24. The controller of claim 19, wherein the data and video signals comprise telephone information and wherein the modulator modulates the telephone information to a baseband frequency band and modulates video signals to a broadband frequency band.

25. The controller of claim 19, wherein the modulator shifts video signals to a higher frequency broadband frequency band.

26. A method comprising:
modulating respective data and video signals received at multiple inputs including a computer data network connection port, a video conference isochronous data connection port, and a television data connection port over selected physical channels into a single line wiring infrastructure, the computer network connection port having several physical channels stacked together;
demodulating respective data and video signals carried on respective physical channels from multiple inputs of the single line wiring infrastructure;
coupling the demodulated data signals to a data network hub; and
coupling the demodulated video signals to a video gateway.

27. The method of claim 26, wherein the data and video signals comprise computer data, video conferencing data and TV data signals and wherein a fan-in multiplexor couples the computer data to a network hub, couples the video conferencing data to a WAN (Wide Area Network) gateway, and couples the TV data signals to a TV switch.

28. The method of claim 26, wherein when a physical channel on the single line wiring infrastructure is selected to serve a video-conference originating from a particular subscriber, connecting that physical channel to a channel between a video server and a wiring infrastructure head end for video-conferencing.

29. The method of claim 26, wherein modulating the video signals comprises modulating video signals to a broadband frequency band, and wherein the data and video signals comprise telephone information, the method further comprising modulating the telephone information to a baseband frequency band.

30. The method of claim 26, wherein modulating comprises shifting video signals to a higher frequency broadband frequency band.

31. An apparatus comprising:
a receiver to receive outgoing signals from a plurality of ports including a computer data network connection port, a video conference isochronous data connection port, and a television data connection port;
processor to determine which signals are digital signals and which signals are analog signals;
a digital to analog converter to convert signals determined to be digital signals to analog signals;
a modulator to modulate each of the analog signals to physical carrier channels, the computer network connection port having several physical channels stacked together; and
a multiplexor to multiplex the modulated analog signals onto a single wire for transmission to a remote site,
wherein the processor is further to control the modulator and the multiplexor.

32. The apparatus of claim 31, wherein the outgoing signals comprise video and telephone signals.

33. The apparatus of claim 31, wherein the outgoing signals comprise network data signals.

34. The apparatus of claim 31, wherein the single wire comprises telephone wiring.

35. The apparatus of claim 31, wherein the single wire comprises cable television wiring.

36. The apparatus of claim 31, further comprising a filter to filter away harmonies in each of the modulated analog signals which do not belong in the frequency range of the analog signal's corresponding carrier frequency.

37. A method comprising:
receiving outgoing signals from a plurality of ports including a computer data network connection port, a video conference isochronous data connection port, and a television data connection port;
determining which signals are digital signals and which signals are analog signals;
converting signals determined to be digital signals to analog signals;
modulating each of the analog signals to physical carrier channels, the computer network connection port having several physical channels stacked together; and
multiplexing the modulated analog signals onto a single wire for transmission to a remote site.

38. The method of claim 37, wherein the outgoing signals comprise video and telephone signals.

39. The method of claim 37, wherein the outgoing signals comprise network data signals.

40. The method of claim 37, wherein the single wire comprises telephone wiring.

41. The method of claim 37, wherein the single wire comprises cable television wiring.

42. The method of claim 37, further comprising filtering away harmonics in each of the modulated analog signals which do not belong in the frequency range of the analog signal's corresponding carrier frequency.

43. An apparatus comprising:
a receiver to receive multiplexed analog signals carried on a plurality of physical carrier channels on a single wire;
a filter to filter incoming modulated analog signals to isolate carrier channels of each of the modulated analog signals;
a demodulator to demodulate each of the modulated analog signals using the frequency of the modulated analog signal's corresponding carrier frequency;
a processor to determine which of the demodulated analog signals are to be processed digitally; and
an analog to digital converter controlled by the processor to convert the analog signals determined to be processed digitally to digital signals and to supply each of the signals to a respective port, the ports including a computer data network connection port, a video conference isochronous data connection port, and a television data connection port, the computer data network connection port having several physical channels stacked together.

44. The apparatus of claim 43, wherein the outgoing signals comprise video and telephone signals.

45. The apparatus of claim 43, wherein the outgoing signals comprise network data signals.

46. The apparatus of claim 43, wherein the single wire comprises telephone wiring.

47. The apparatus of claim 43, wherein the single wire comprises cable television wiring.

48. The apparatus of claim 43, further comprising filtering away harmonics in each of the demodulated analog signals which do not belong in the frequency range of the analog signal's corresponding carrier frequency before converting.

49. A method comprising:
receiving multiplexed analog signals carried on a plurality of physical carrier channels on a single wire;
filtering incoming modulated analog signals to isolate carrier channels of each of the modulated analog signals the number of channels for each signal being higher for signals from higher bandwidth connection ports;
demodulating each of the modulated analog signals using the frequency of the modulated analog signal's corresponding carrier frequency;
determining which of the demodulated analog signals are to be processed digitally;
converting the analog signals determined to be processed digitally to digital signals; and
supplying each of the signals to a respective port, the ports including a computer data network connection port, a video conference isochronous data connection port, and a television data connection port, the computer data network connection port having several physical channels stacked together.

50. The method of claim 49, wherein the outgoing signals comprise video and telephone signals.

51. The method of claim 49, wherein the outgoing signals comprise network data signals.

52. The method of claim 49, wherein the single wire comprises telephone wiring.

53. The method of claim 49, wherein the single wire comprises cable television wiring.

54. The method of claim 49, further comprising filtering away harmonics in each of the demodulated analog signals which do not belong in the frequency range of the analog signal's corresponding carrier frequency before converting.

55. An apparatus comprising:
means for modulating information streams from a computer data network connection port, a video conference isochronous data connection port, and a television data connection port over selected physical channels on a single line wiring infrastructure, the computer data network connection port having several physical channels stacked together;
means for demodulating information streams from the selected physical channels on the single line wiring infrastructure; and
means for communicating the information streams through a connection port to a client device.

56. The memory of claim 55, wherein the information streams comprise at least one of computer data, television data, and video conferencing data.

57. The apparatus of claim 55, further comprising means for converting an information stream to an analog signal before modulating.

58. An apparatus comprising:
means for modulating respective data and video signals received at multiple inputs including a computer data network connection port, a video conference isochronous data connection port, and a television data connection port over selected physical channels into a single line wiring infrastructure, the computer data network connection port having several physical channels stacked together;
means for demodulating respective data and video signals carried on respective physical channels from multiple inputs of the single line wiring infrastructure;
means for coupling the demodulated data signals to a data network hub; and
means for coupling the demodulated video signals to a video gateway.

59. The apparatus of claim 58, wherein the means for modulating the video signals comprises means for modulating video signals to a broadband frequency band, and wherein the data and video signals comprise telephone information, the apparatus further comprising means for modulating the telephone information to a baseband frequency band.

60. The apparatus of claim 58, wherein the means for modulating shifts video signals to a higher frequency broadband frequency band.

61. An apparatus comprising:
means for receiving outgoing signals from a plurality of ports including a computer data network connection port, a video conference isochronous data connection port, and a television data connection port;
means for determining which signals are digital signals and which signals are analog signals;
means for converting signals determined to be digital signals to analog signals;
means for modulating each of the analog signals to physical carrier channel the computer data network connection port having several physical channels stacked together; and
means for multiplexing the modulated analog signals onto a single wire for transmission to a remote site.

62. The apparatus of claim 61, wherein the single wire comprises telephone wiring.

63. The apparatus of claim 62, wherein the single wire comprises cable television wiring.

64. An apparatus comprising:
means for receiving multiplexed analog signals carried on a plurality of physical carrier channels on a single wire;
means for filtering incoming modulated analog signals to isolate carrier channels of each of the modulated analog signals, the computer data network connection port having several physical channels stacked together;
means for demodulating each of the modulated analog signals using the frequency of the modulated analog signal's corresponding carrier frequency;
means for determining which of the demodulated analog signals are to be processed digitally;
means for converting the analog signals determined to be processed digitally to digital signals; and
means for supplying each of the signals to a respective port, the ports including a computer data network connection port, a video conference isochronous data connection port, and a television data connection port.

65. The apparatus of claim 64, wherein the outgoing signals comprise video and telephone signals.

66. The apparatus of claim 64, wherein the outgoing signals comprise network data signals.

* * * * *

UNITED STATES PATENT AND TRADEMARK OFFICE
CERTIFICATE OF CORRECTION

PATENT NO. : 7,570,607 B2 Page 1 of 1
APPLICATION NO. : 10/860728
DATED : August 4, 2009
INVENTOR(S) : Andersen et al.

It is certified that error appears in the above-identified patent and that said Letters Patent is hereby corrected as shown below:

In column 13, at line 15, delete, "CATY" and insert --CATV--.

Signed and Sealed this

Third Day of August, 2010

David J. Kappos
*Director of the United States Patent and Trademark Office*